US005496050A

United States Patent [19]

Geiger et al.

[11] Patent Number: 5,496,050

[45] Date of Patent: Mar. 5, 1996

[54] FOLDABLE WHEELCHAIR AND SIDE FRAME ASSEMBLY FOR FOLDABLE WHEELCHAIR

[75] Inventors: Richard Geiger, Alameda; A. Scott Robertson; Neville Page, both of San Francisco, both of Calif.

[73] Assignee: Everest & Jennings International Ltd., St. Louis, Mo.

[21] Appl. No.: 193,501

[22] Filed: Feb. 8, 1994

Related U.S. Application Data

[63] Continuation of Ser. No. 886,850, May 22, 1992, Pat. No. 5,284,350.

[51] Int. Cl.$^6$ .................................................... B62M 1/14

[52] U.S. Cl. ........................ 280/250.1; 280/650; 280/657

[58] Field of Search .............................. 280/39, 42, 47.4, 280/250.1, 304.1, 644, 649, 650, 657; 297/DIG. 4

[56] References Cited

U.S. PATENT DOCUMENTS

| | | | |
|---|---|---|---|
| 3,337,261 | 8/1967 | Nihlean et al. . | |
| 4,082,348 | 4/1978 | Haury . | |
| 4,101,143 | 7/1978 | Sieber . | |
| 4,166,631 | 9/1979 | Sanaski . | |
| 4,350,227 | 9/1982 | Knoche . | |
| 4,351,540 | 9/1982 | Minnebraker . | |
| 4,428,594 | 1/1984 | Minnebraker . | |
| 4,477,098 | 10/1984 | Minnebraker | 280/250.1 |
| 4,489,955 | 12/1984 | Hamilton . | |
| 4,572,576 | 2/1986 | Minnebraker . | |
| 4,592,570 | 6/1986 | Nassiri . | |
| 4,593,929 | 6/1986 | Williams . | |
| 4,595,212 | 6/1986 | Haury et al. . | |
| 4,598,921 | 7/1986 | Fenwick | 280/657 X |
| 4,648,619 | 3/1987 | Jungnell et al. . | |
| 4,676,519 | 6/1987 | Meier . | |
| 4,693,490 | 9/1987 | Loodberg et al. . | |
| 4,721,321 | 1/1988 | Haury et al. . | |
| 4,730,842 | 3/1988 | Summers et al. | 280/657 X |
| 4,768,797 | 9/1988 | Friedrich . | |
| 4,770,432 | 9/1988 | Wagner . | |
| 4,813,693 | 3/1989 | Lockard et al. | 280/42 |
| 4,840,390 | 6/1989 | Lockard et al. . | |
| 4,852,899 | 8/1989 | Kueschall | 280/657 X |
| 4,887,826 | 12/1989 | Kantner . | |
| 4,917,395 | 4/1990 | Gabriele . | |
| 5,076,602 | 12/1991 | Robertson et al. | 280/250.1 X |
| 5,131,672 | 7/1992 | Robertson et al. | 280/250.1 |
| 5,143,391 | 9/1992 | Robertson et al. | 280/250.1 |
| 5,152,543 | 10/1992 | Sims et al. | 280/250.1 |
| 5,188,383 | 2/1993 | Thompson | 280/657 X |
| 5,267,745 | 12/1993 | Robertson et al. | 280/250.1 |
| 5,284,350 | 2/1994 | Geiger et al. | 280/650 X |
| 5,320,373 | 6/1994 | Robertson et al. | 280/250.1 |
| 5,409,247 | 4/1995 | Robertson et al. | 280/250.1 |

FOREIGN PATENT DOCUMENTS

| | | | |
|---|---|---|---|
| 0268960 | 6/1988 | European Pat. Off. | 280/304.1 |

*Primary Examiner*—Brian L. Johnson
*Attorney, Agent, or Firm*—Burns, Doane, Swecker & Mathis

[57] ABSTRACT

A foldable wheelchair has a folding mechanism connecting two side frame assemblies to each other. The side frame assemblies each support a castor frame piece, pivoting shafts of the folding mechanism, drive wheel axles and a seat back tube. The side frame assemblies are made of two halves that are secured together and may be fabricated from compression or injection molded composite plastics. The seat angle is adjusted by pivoting the side frame assemblies around a pivot point located in an upward and forward region of the side frame assembly.

19 Claims, 6 Drawing Sheets

FOLDABLE WHEELCHAIR AND SIDE FRAME ASSEMBLY FOR FOLDABLE WHEELCHAIR

This application is a continuation of application Ser. No. 07/886,850, filed May 22, 1992, now U.S. Pat. No. 5,284, 350.

FIELD OF THE INVENTION

The present invention relates to wheelchairs and particularly to foldable wheelchair and side frame assemblies for foldable wheelchairs.

BACKGROUND

In numerous public places, and especially at places such as airports and hospitals, there repeatedly arises the need to meet the short-term transportation requirements of the ill, handicapped, elderly or otherwise infirm. For many years, the foldable wheelchair has met that need. Its typically-lighterweight design and typically all-purpose utility has made the foldable wheelchair readily available for use in virtually all situations encountered in those environments. Furthermore, the foldable design has enabled efficient storage of the wheelchair when not in use, a feature especially important where it is vital to keep hallways and other thoroughfares free and clear for other traffic.

However, in recent years, where awareness and sensitivity to meeting the transportation needs of the inform has increased, it has been discovered that the designs of prior art foldable wheelchairs, while still better suited than non-folding wheelchairs, are deficient in many respects. For example, the prior an designs are rather bulky and unwieldy and not sufficiently adaptable to the comforts of the user. Hence, a need has arisen to maintain and enhance the attractive characteristics of the foldable wheelchair design such as quick deployment and efficient storage, while improving other characteristics by trimming weight and adding greater adjustability to more adequately address the comforts of the user.

OBJECTS AND SUMMARY

It is therefor an object of the present invention to provide a foldable wheelchair design that offers quick deployment and efficient storage characteristics and improvements over the prior art designs.

It is an object of the present invention to provide a foldable wheelchair design that is lightweight yet sufficiently durable for repeated use in a wide variety of situations.

It is an object of the present invention to provide a foldable wheelchair design offering increased adjustability to meet the particular needs and comforts of the user.

It is an object of the present invention to provide a foldable wheelchair design that offers improvements over the prior art yet is economically produced.

It is an object of the present invention to pro,vide a design for a side frame assembly for a foldable wheelchair that is durable for repeated use in a wide variety of situations.

It is an object of the present invention to provide a design for a side frame assembly for a foldable wheelchair that offers increased adjustability to meet the particular needs and comforts of the user.

These and other objects not specifically listed are fulfilled by a foldable wheelchair having a pair of side assemblies that are connected to each other by a means for folding. The side frame assemblies each include a first and second pivot attachment region for connecting the side frame assemblies to the means for folding wherein the first pivot attachment region is at an upper middle region of the side assembly and the second pivot attachment region is at a lower middle region of the side assembly.

The foldable wheelchair also has a seat assembly spanning the distance between the side frame assemblies. A means for supporting the seat assembly is disposed at a top region of each side assembly.

The means for folding includes a pair of shafts connected to each other at a common pivot point centrally located on the shafts. One of the shafts is pivotally attached to the first pivot attachment region of a side assembly and extends across the distance between the pair of side frame assemblies to one side of the seat assembly. The other shaft is pivotally attached to the first pivot attachment region of the other side assembly and extends across the distance between the pair of side frame assemblies to an opposite side of the seat assembly. The means for folding also includes a pair of pivot links, each of which is pivotally attached to the second pivot attachment region of a respective side assembly and extends to a corresponding shaft of the means for folding.

These and other objects not specifically listed are fulfilled by a side assembly of a foldable wheelchair frame having means for receiving a drive wheel axle at any of a plurality of different locations in a rearward region of the side assembly such that a height and a center of gravity of the side assembly relative to the drive wheel axle may be varied. The side assembly also includes means for supporting a wheelchair seat assembly at a top region of the side assembly and a means for pivotally attaching and fixing a caster frame piece to the side assembly such that a seat angle may be varied relative to a ground surface.

A pair of pivot attachment regions are provided for attaching a folding mechanism to the side assembly. One of the pair is disposed at an upper middle region of the side assembly and the other of the pair is disposed at a lower middle region of the side assembly.

BRIEF DESCRIPTION OF THE DRAWINGS

Preferred embodiments of the present invention will be described with reference to the accompanying drawing figures, wherein like reference numerals refer to like items and wherein.

DESCRIPTION

Figure 1:
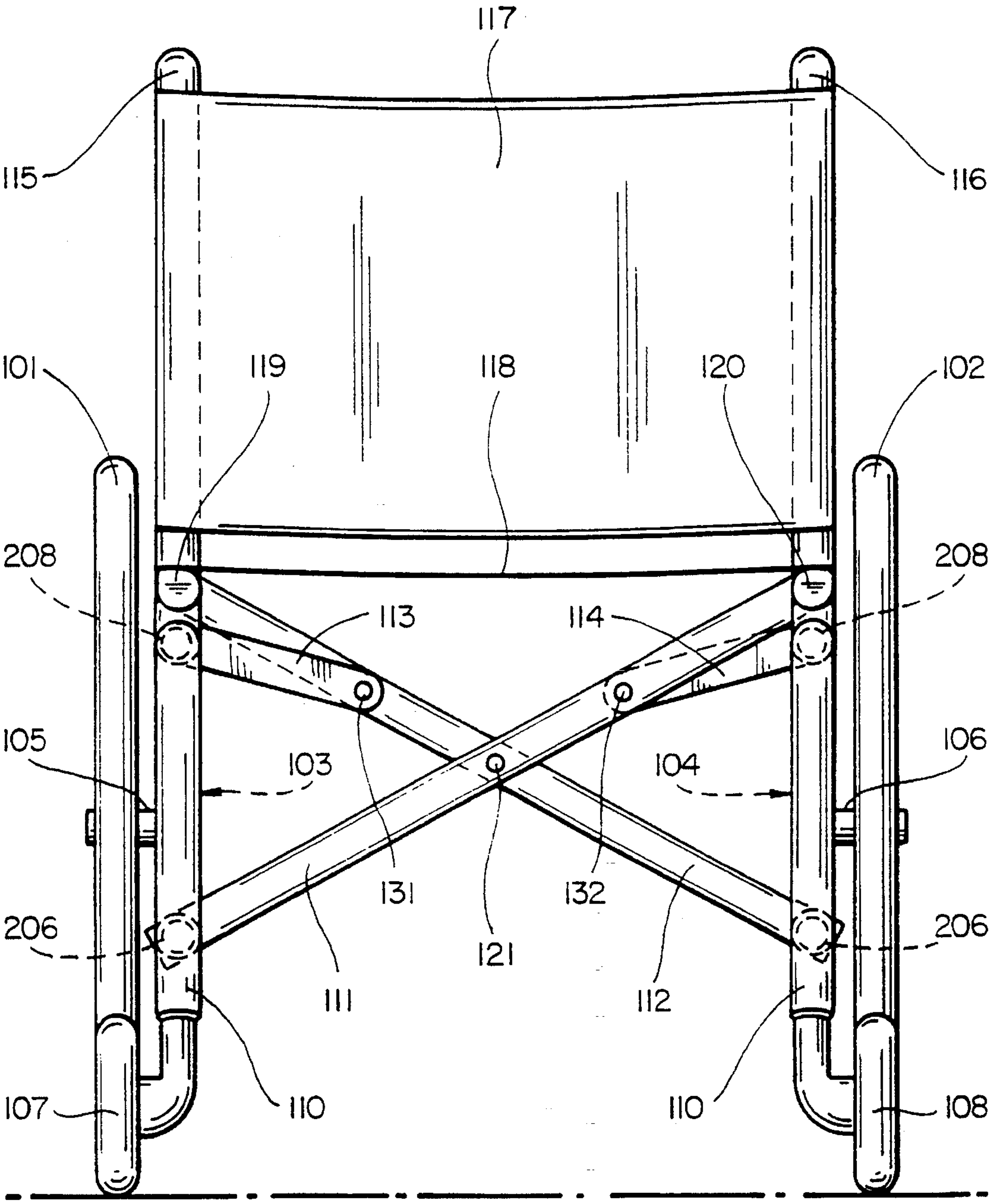
FIG. 1 is a front view of a foldable wheelchair in accordance with a preferred embodiment of the present invention.
Figure 2:
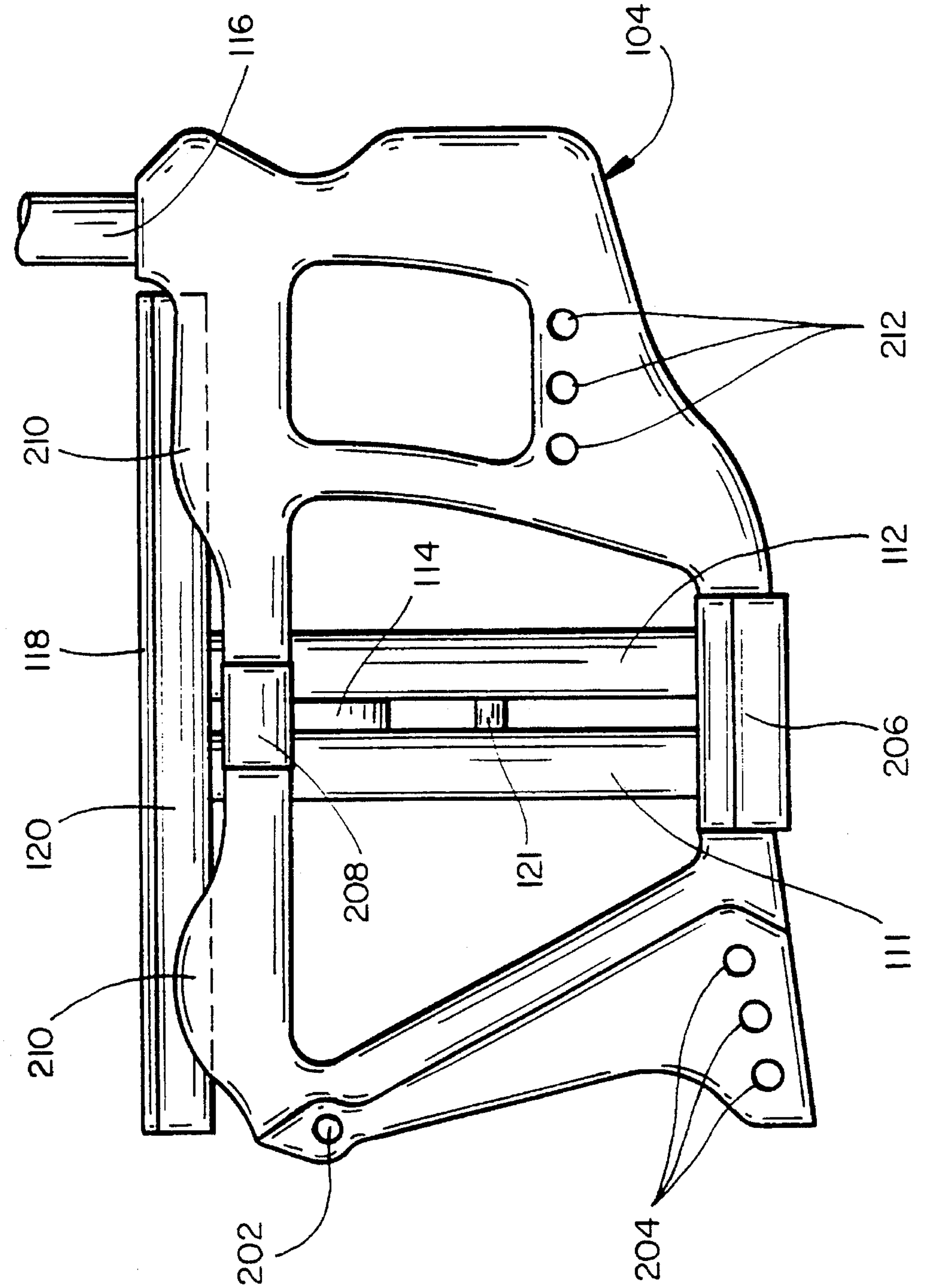
FIG. 2 is a side view of the foldable wheelchair depicted in FIG. 1.
Figure 3:
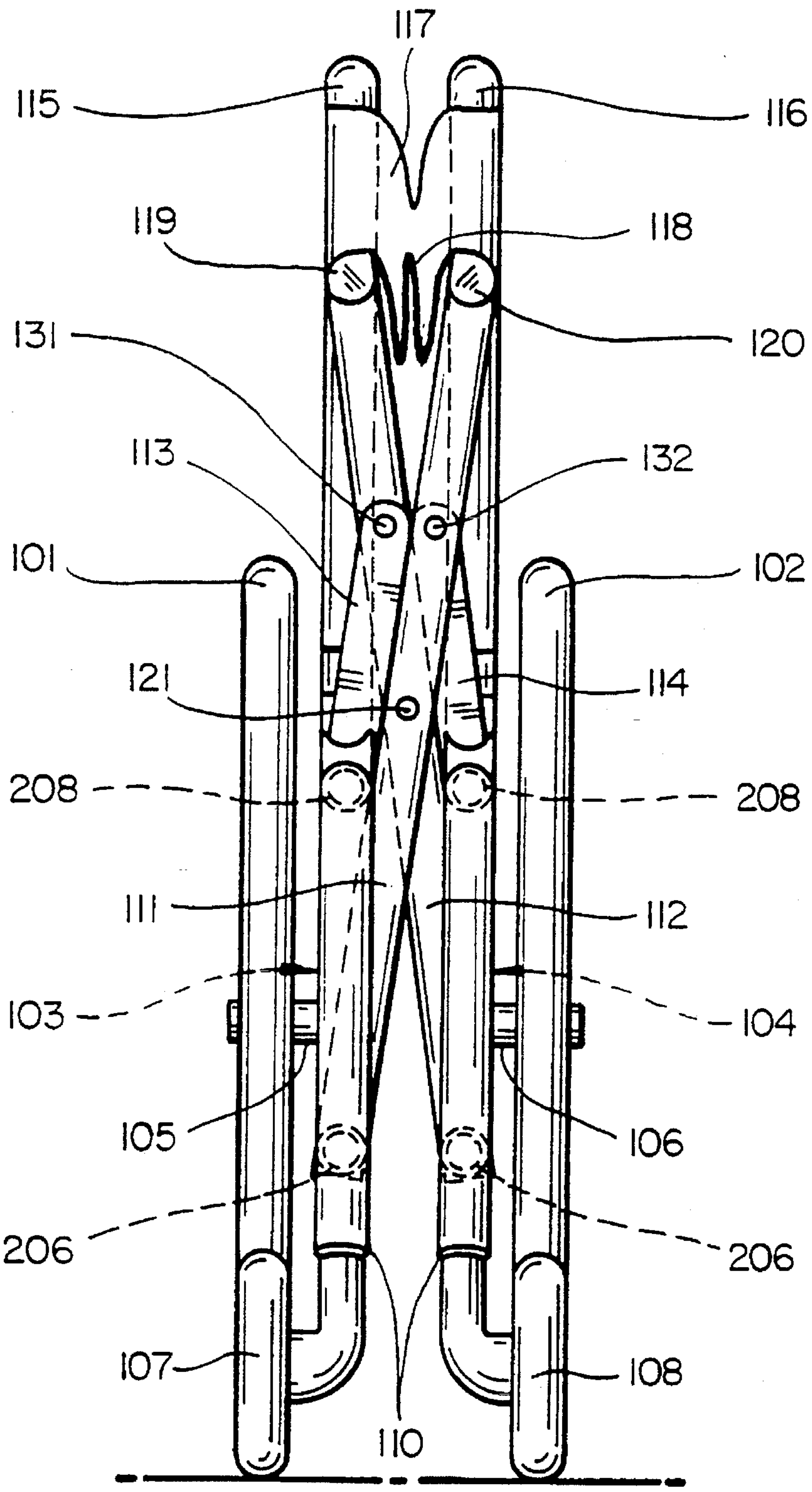
FIG. 3 is a front view of a foldable wheelchair in accordance with a preferred embodiment of the present invention as it appears in a folded configuration.

The present invention relates to foldable wheelchair and a side frame assembly 103, 104 for a foldable wheelchair (FIGS. 1–3). The side frame assemblies 103, 104 are spaced opposite each other and provide support for drive wheels 101, 102, castors 107, 108, a seat assembly 118 and a backrest assembly 115, 116, 117. The two side frame assemblies 103, 104 are connected to each other by a folding mechanism.

The folding mechanism (FIGS. 1–3) includes a pair of shafts 111, 112 that are pivotally connected to each other at a pivot point 121 that is centrally located on each shaft. One of the shafts 111 is connected to a lower pivot attachment region of the side frame assembly 103 with a shaft sleeve 206 connected to one end of the shaft 111. The shaft 111 extends at an angle upwardly from that pivot attachment region, across the distance between the two side assemblies and is connected to an extruded tube 120 of the seat assembly. The other shaft 112 is connected to the side frame assembly 104 at a lower pivot attachment region with a shaft sleeve 206 connected to one end of the shaft 112. The other shaft 112 similarly extends at an angle upwardly from the lower pivot attachment region, across the distance between the two side assemblies, and is connected to a seat extrusion tube 119.

Also included in the folding mechanism are a pair of pivot links 113, 114. The first pivot link 113 is connected at an upper portion of one of the shafts 112 at a pivot point 131 and is connected to an upper middle pivot attachment region of the side frame assembly 103 with a shaft sleeve 208 fixed to one end of the first pivot link 113. Similarly, the second pivot link 114 is connected to an upper portion of one of the shafts 111 at a pivot point 132 and extends to an upper middle pivot attachment region of the side frame assembly 104 with a shaft sleeve 208 fixed to one end of the second pivot link 114.

For folding the wheelchair, the two sides of the wheelchair are urged inwardly towards each other such that the shafts 111, 112 pivot around pivot point 121 and pivot lengths 113, 114 pivot around pivot points 131, 132, respectively. Through shaft sleeve 208, the pivot links 113, 114 also rotate into an upwardly extending position and thereby guide the movement of the shafts 111, 112 into the folded configuration (FIG. 3).

The seat assembly includes a pair of extruded tubes 119, 120 that rest on an upper region of the side frame assemblies 103, 104 when the wheelchair is unfolded. Spanning between the two extruded tubes 119, 120 is a nylon seat sling 118. (FIG. 1). The seat sling 118 is secured in each extruded tube 119, 120 by being wrapped around a dowel 802 that is insertable along the length of each extruded tube 119, 120.

Each side frame assembly 103, 104 for a foldable wheelchair is substantially identical. Hence, the subsequent description will refer only to one side frame assembly 104. It is appreciated that identical features are present on the opposite side frame assembly 103. In fact, the side frames 103, 104 are completely interchangeable and may be used as either side of the foldable wheelchair.

A forward region of the side frame assembly 104 serves to attach and support a castor frame piece 110 (FIGS. 2 and 4) which is connected to a side frame assembly 104 at two locations. One location is the pivot point 202 disposed at an upper forward region of the side frame assembly 104. The other location is at any of a plurality of holes 204 disposed at a lower forward region of the side frame assembly 104. The sideframe assembly 104 will freely pivot around the castor frame piece at pivot point 202 according to the selection of the holes 204.

The castor frame piece includes leg rest receiving lugs 460 supporting a leg rest and a castor receptacle 462. The lugs 460 and receptacle 462 are positioned along an axis that is at a right angle with the travelling surface.

The selection of a hole 204 to secure the lower portion of the castor frame piece 110 to the side assembly 104 dictates the relative angular position of the side frame assembly 104 to the castor frame piece 110. Therefore, the selection of a hole 204 will dictate the ultimate seat angle relative to the traveling surface for the user. Since the pivot point 202 is disposed at the upward forward region of the side assembly 104, any change in seat angle has only a minimal effect on the rotational distance between the seat sling 118 and leg rest mounted on the castor frame piece 110. Consequently, any of a number of seat angles may be chosen without needing to also adjust the leg rest. In fact, in this manner, the leg rest and castor assembly stay fixed in space during all changes of seat angle.

The drive wheel 102 is attached by way of axle 106 to a rearward region of the side frame assembly 104. The axle 106 may be received in any of a plurality of axle receiving holes 212. The holes 212 are located at various lateral and vertical position and in the rearward region of the side assembly 104. Hence, the wheel 102 is easily attached to the side frame assembly 104 according to any of a number of positions to obtain a desired center of gravity and seat angle and height. When a wheel 102 is attached at the forward most hole 212, the resulting seat pan angle is about 3°.

In one embodiment, further adjustability to the location of attachment of the drive wheel 102 may be obtained through the use of an axle plate 450 that may be bolted at various positions on the side frame assembly 104 at bolt points 222. (FIG. 4) The axle plate would include a series of axle receiving holes 212, any of which could be suitable to receive the axle 106 of the drive wheel 102. The axle plate 450 can be secured at any of a set of the bolt points 222 positioned along the side frame assembly. The sets of bolt points 222 are disposed on the side frame assembly 104 along arcs whose radii originate from the pivot points 202. Consequently, the seat pan angle can be adjusted while maintaining a desired center of gravity according to placement of the axle plate 450 in the proper bolt points 222. This gives further adjustability to the seal angle and seat height.

Figure 7:
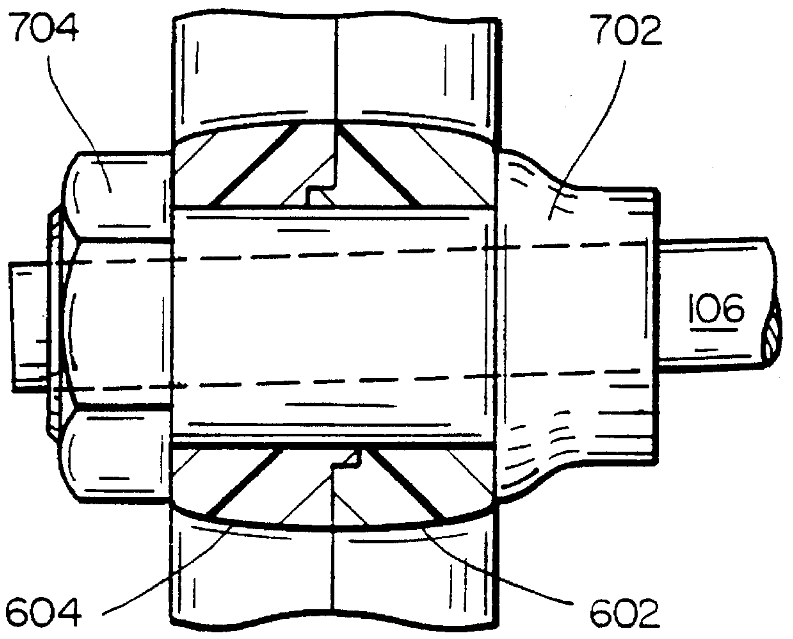
FIG. 7 is a cross-sectional view taken along the lines 7—7 of the side frame assembly of FIG. 4.
Figure 8:
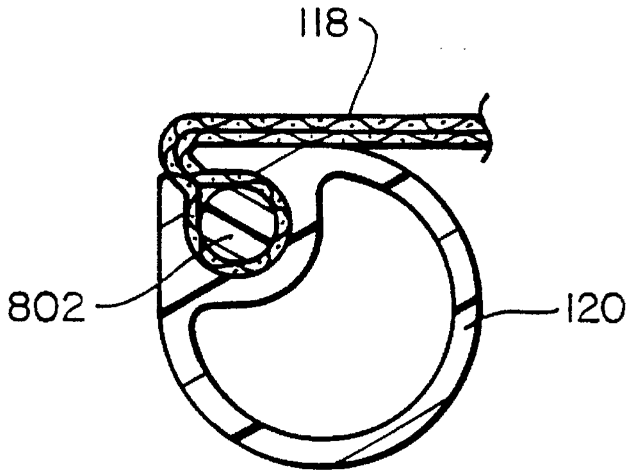
FIG. 8 is a cross-sectional view taken along the lines 8—8 of the side frame assembly and seat assembly in FIG. 4.

In another embodiment, the holes 212 of the side assembly 104 may be sized so as to receive a camber plug 702 (FIG. 7). The camber plug 702 is secured in the hole 212 by a nut 704 and would be sized to receive the axle 106. A plurality of camber plugs 702 are available, each of which receiving the axle 106 at a different angle relative to the axis of hole 112, and thereby enabling the drive wheel 102 to be attached at any of a variety of wheel camber angles.

Figure 4:
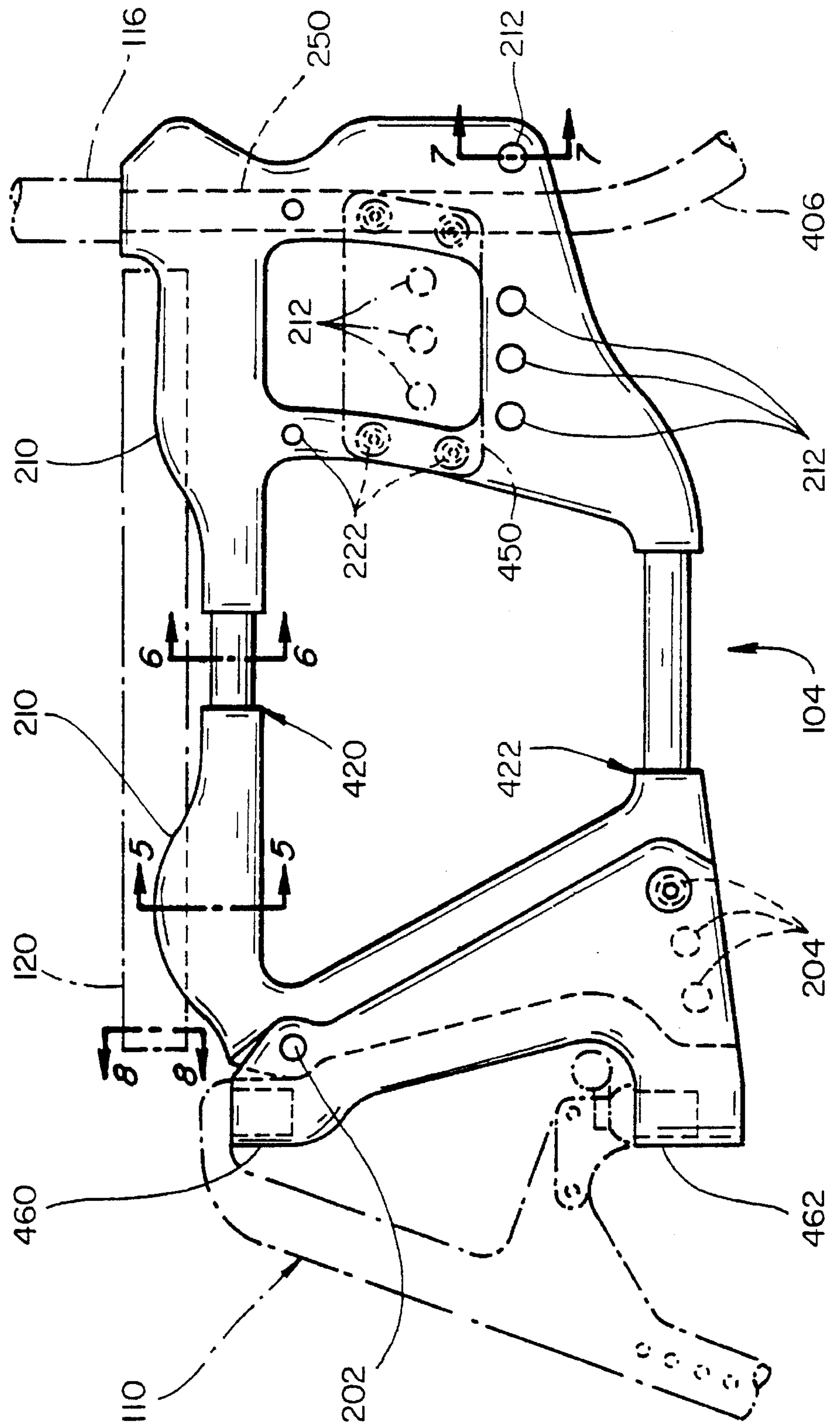
FIG. 4 is a side view of a side frame assembly of a foldable wheelchair in accordance with a preferred embodiment of the present invention.

The rearward region of the side frame assembly 104 also includes a cylindrically shaped opening that extends substantially the height of the rearward region of the side assembly 104 (FIG. 4). In one embodiment, the opening 250 extends the entire height of the rearward region of the side assembly 104. The opening 250 receives a tube 116 for the backrest of the wheelchair. In the embodiment where the opening 250 extends the entire length of the rearward region, an anti-tip robe 406 may be inserted into the opening 250 from the bottom of the side frame assembly 104 and received within the backrest support tube 116.

The side frame assembly 104 includes an upper middle pivot attachment region for receiving the shaft sleeve 208 of one of the pivot links 114 of the folding mechanism. The side frame assembly 104 also includes a lower middle pivot attachment region for receiving the shaft sleeve 206 of one of the shafts 112 of the folding mechanism. The shaft sleeves 206, 208 may freely rotate about the upper and lower middle pivot attachment regions, respectively, so that the wheelchair is easily adjusted into the foldable condition.

Figure 6:
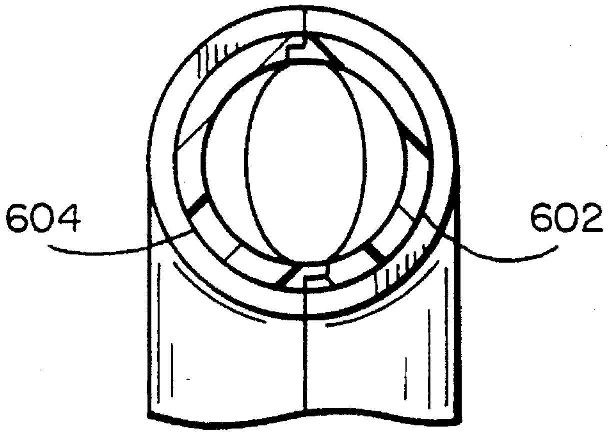
FIG. 6 is a cross-sectional view taken along the lines 6—6 of the side frame assembly of FIG. 4.

The side frame assembly 104 is preferably constructed of two compression or injection molded halves 602, 604 of composite material that are bolted together at various locations. The two halves are shaped to create a tubular appearance (FIG. 6).

Figure 5:
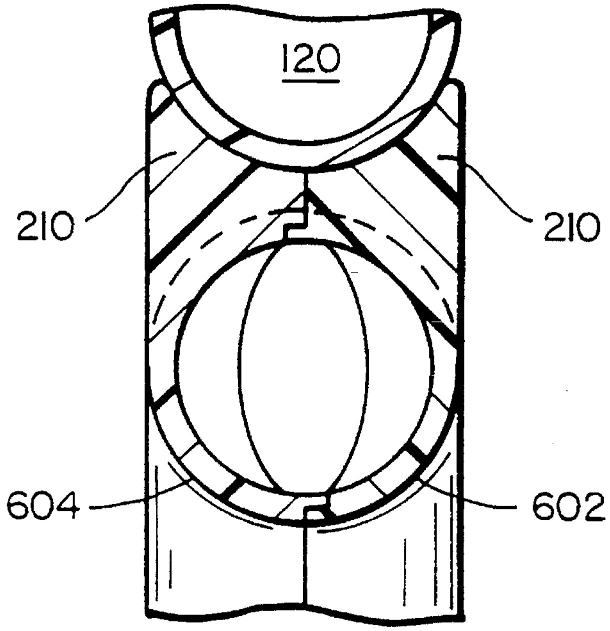
FIG. 5 is a cross-sectional view taken along the lines 5—5 of the side frame assembly of FIG. 4.

In order to support the extruded tube 120 of the seat assembly, an upper region of the side frame assembly 104 is molded to include contoured walls 210 (FIGS. 4 and 5) that form a cradle for receiving the extruded tube 120. Consequently, during use, the wheelchair will have added lateral stability.

In order to economically produce foldable wheelchairs of different chassis lengths, the mold for the side assembly 104 is designed so that by methods of blocking in the mold, different lengths of the side frame assembly 104 may be obtained. In particular, by providing a mold that may be blocked at one inch intervals at blocking points 420, 422 in a middle region of the side assembly 104, different lengths of side assemblies 104 may be obtained to provide a chassis having a length anywhere from 16 inches to 20 inches.

The principals, preferred embodiments and modes of operation of the present invention have been described in the foregoing specification, however, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, may be embraced thereby.

What is claimed is:

1. A wheelchair side frame assembly comprising:

a side frame piece;

a caster frame piece;

mounting means located at a forward region of the side frame piece for pivotally mounting the caster frame piece at a pivot point on the side frame piece to permit relative pivoting movement between the side frame piece and the caster frame piece about said pivot point;

a plurality of spaced apart discretely defined mounting positions located at a rearward region of the side frame piece for mounting a drive wheel, said spaced apart discretely defined mounting positions being disposed along an arc of a circle having a center of curvature coincident with said pivot point.

2. A wheelchair side frame assembly as set forth in claim 1, wherein said pivot point is disposed at an upper forward region of said side frame piece and including a plurality of angle adjustment holes disposed at a lower forward region of said side frame piece for orienting said caster frame piece and said side frame piece at a desired orientation relative to one another.

3. A wheelchair side frame assembly as set forth in claim 1, wherein said side frame piece is formed of two composite molded halves joined together.

4. A wheelchair side frame assembly as set forth in claim 3, wherein said two composite molded halves are shaped such that said side frame piece has the appearance of a tubular construction.

5. A wheelchair side frame assembly as set forth in claim 3, wherein said side frame piece includes upwardly extending molded-in and contoured sides that define a cradle for receiving a seat tube of a seat assembly.

6. A wheelchair side frame assembly as set forth in claim 1, including a drive wheel axle receiving plate for receiving an axle of a drive wheel, said plurality of spaced apart discretely defined mounting positions including a plurality of bolt holes formed in said side frame piece for attaching the axle plate to said rearward region of said side frame piece, said axle plate including a plurality of openings for receiving a drive wheel axle.

7. A wheelchair side frame assembly as set forth in claim 1, including an opening extending the height of said rearward region of said side frame piece for receiving a seat back tube.

8. A wheelchair side frame assembly as set forth in claim 1, wherein said plurality of spaced apart discretely defined mounting positions includes a plurality of holes positioned along said arc of a circle whose center of curvature is coincident with said pivot point.

9. A side assembly as set forth in claim 6, including a plurality of camber plugs which are positionable one at a time in one of the openings in the drive wheel axle receiving plate, the openings in the drive wheel axle receiving plate each having an axis, each of the camber plugs being constructed to receive and orient an axle of a drive wheel at a different angle relative to the axis of the openings in the drive wheel axle receiving plate.

10. A wheelchair frame comprising:

a pair of side frame assemblies, each of said side frame assemblies comprising a side frame piece and a caster frame piece, a forward region of each side frame piece including mounting means for pivotally mounting a respective one of the caster frame pieces at a pivot point on the side frame piece to permit relative pivoting movement between each side frame piece and the respective caster frame piece about said pivot point, a rearward region of each side frame piece including a plurality of spaced apart discretely defined mounting positions for mounting a drive wheel on each side frame piece, the spaced apart discretely defined mounting positions on each respective side frame piece being disposed along an arc of a circle having a center of curvature coincident with said pivot point on the respective side frame piece;

a seat assembly extending between said pair of side frame assemblies; and a connecting frame piece for connecting said side frame assemblies to one another.

11. A wheelchair frame as set forth in claim 10, wherein said pair of side frame assemblies are formed of two composite molded halves joined together.

12. A wheelchair frame as set forth in claim 10, wherein said seat assembly includes a pair of extruded tubes, each having means for retaining a flexible seat sling extending between said pair of extruded tubes.

13. A wheelchair frame as set forth in claim 12, wherein each side frame piece includes upwardly extending molded-in contoured sides that form a cradle for receiving said extruded tubes of said seat assembly.

14. A wheelchair frame as set forth in claim 10, wherein said pair of side frame assemblies are identical to one another to permit the side frame assemblies to be interchanged with one another for use as both left and right sides of said wheelchair frame.

15. A wheelchair frame as set forth in claim 10, wherein said plurality of spaced apart discretely defined mounting positions at the rearward region of each respective side frame piece includes a plurality of spaced apart holes.

16. A wheelchair frame according to claim 10, including a pair of drive wheel axle receiving plates which each include a plurality of openings for receiving a drive wheel axle at one of a plurality of positions and which are each mountable on a respective one of the side frame pieces, the plurality of spaced apart discretely defined mounting positions at the rearward region of each respective side frame piece including a plurality of spaced apart holes for mounting the respective one of the drive wheel axle receiving plates.

17. A wheelchair frame according to claim 16, including a plurality of camber plugs which are positionable one at a time in one of the openings in each of the drive wheel axle receiving plates, the openings in the drive wheel axle receiving plates each having an axis, each of the camber plugs being constructed to receive and orient an axle of a drive wheel at a different angle relative to the axis of the openings in the drive wheel axle receiving plates.

18. A wheelchair frame according to claim 11, wherein said two composite molded halves are shaped such that said side frame assemblies each have the appearance of a tubular construction.

19. A wheelchair frame as set forth in claim 10, wherein said connecting frame piece includes means for folding said side frame assemblies.

* * * * *